United States Patent
Sugaya et al.

(10) Patent No.: US 9,379,376 B2
(45) Date of Patent: Jun. 28, 2016

(54) POSITIVE ELECTRODE CONTAINING LITHIUM NICKEL COMPOSITE OXIDE FOR NON-AQUEOUS ELECTROLYTE SECONDARY BATTERY, NON-AQUEOUS ELECTROLYTE SECONDARY BATTERY USING THE SAME, AND METHOD FOR PRODUCING THE SAME

(75) Inventors: Junichi Sugaya, Osaka (JP); Yoshiyuki Muraoka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1165 days.

(21) Appl. No.: 12/992,245

(22) PCT Filed: Mar. 11, 2010

(86) PCT No.: PCT/JP2010/001740
§ 371 (c)(1),
(2), (4) Date: Nov. 11, 2010

(87) PCT Pub. No.: WO2010/106768
PCT Pub. Date: Sep. 23, 2010

(65) Prior Publication Data
US 2011/0104569 A1 May 5, 2011

(30) Foreign Application Priority Data

Mar. 18, 2009 (JP) ................. 2009-066399

(51) Int. Cl.
*H01M 4/131* (2010.01)
*H01M 4/1391* (2010.01)
(Continued)

(52) U.S. Cl.
CPC ............ *H01M 4/131* (2013.01); *H01M 4/1391* (2013.01); *H01M 4/505* (2013.01); *H01M 4/525* (2013.01); *Y02E 60/122* (2013.01); *Y02P 70/54* (2015.11)

(58) Field of Classification Search
CPC . H01M 4/0435; H01M 4/131; H01M 4/1391; H01M 4/505; H01M 4/525

USPC ........................................ 429/220, 223, 231.1
See application file for complete search history.

(56) References Cited

U.S. PATENT DOCUMENTS

2004/0201948 A1  10/2004  Hosoya et al.
2007/0224505 A1*  9/2007  Kita et al. .................. 429/231.1
(Continued)

FOREIGN PATENT DOCUMENTS

CN          1905101 A       1/2007
JP          2001-015168     1/2001
(Continued)

OTHER PUBLICATIONS

Chinese Office Action issued in Chinese Patent Application No. 201080001664.X mailed Jan. 11, 2013.

*Primary Examiner* — Sean P Cullen
(74) *Attorney, Agent, or Firm* — McDermott Will & Emery LLP (57) ABSTRACT

A method for producing a positive electrode for non-aqueous electrolyte secondary battery of the present invention includes the steps of: (1) producing a positive electrode precursor by applying a positive electrode slurry including a positive electrode active material comprising a lithium-containing composite oxide including nickel, a binder, and a conductive agent on a positive electrode core material, the positive electrode active material including secondary particles having an average particle diameter of 8 μm or more, and then drying the positive electrode slurry to form a positive electrode material mixture layer; and (2) rolling while heating the positive electrode precursor to produce a positive electrode in which 3.5 g or more of the positive electrode active material is included per 1 cm³ of the positive electrode material mixture layer, and the positive electrode active material includes secondary particles having an average particle diameter of 5 μm or more.

3 Claims, 1 Drawing Sheet

(51) Int. Cl.
*H01M 4/04* (2006.01)
*H01M 4/505* (2010.01)
*H01M 4/525* (2010.01)

(56) References Cited

U.S. PATENT DOCUMENTS

2008/0131776 A1   6/2008  Sakuma et al.
2009/0087362 A1   4/2009  Sun et al.
2010/0012403 A1*  1/2010  Fujita et al. .................. 180/65.1

FOREIGN PATENT DOCUMENTS

| | | |
|---|---|---|
| JP | 2001-223011 | 8/2001 |
| JP | 2002-170566 | 6/2002 |
| JP | 2004-319105 | 11/2004 |
| JP | 2006-156021 | 6/2006 |
| JP | 2008-536285 | 9/2008 |
| WO | WO 2006/080259 A1 | 8/2006 |
| WO | WO 2006129756 A1 * | 12/2006 |

* cited by examiner

POSITIVE ELECTRODE CONTAINING LITHIUM NICKEL COMPOSITE OXIDE FOR NON-AQUEOUS ELECTROLYTE SECONDARY BATTERY, NON-AQUEOUS ELECTROLYTE SECONDARY BATTERY USING THE SAME, AND METHOD FOR PRODUCING THE SAME

RELATED APPLICATIONS

This application is the U.S. National Phase under 35 U.S.C. §371 of International Application No. PCT/JP2010/001740, filed on Mar. 11, 2010, which in turn claims the benefit of Japanese Application No. 2009-066399, filed on Mar. 18, 2009, the disclosures of which Applications are incorporated by reference herein.

TECHNICAL FIELD

The present invention relates to a non-aqueous electrolyte secondary battery, and particularly relates to a positive electrode including a lithium-containing composite oxide including nickel as an active material, and a method for producing the same.

BACKGROUND ART

In a positive electrode of a non-aqueous electrolyte secondary battery represented by a lithium ion secondary battery, a lithium-containing composite oxide including nickel is used as a positive electrode active material.

The positive electrode is produced as follows. A positive electrode active material, a binder, and a conductive agent are mixed in the presence of a prescribed dispersing medium to prepare a positive electrode slurry. The positive electrode slurry is applied onto a positive electrode core material made of an aluminum foil etc., which is then dried to form a positive electrode material mixture layer, thereby obtaining a positive electrode precursor. Subsequently, the positive electrode precursor is rolled with rollers. The positive electrode is produced in this manner.

Various studies have been made on the lithium-containing composite oxide including nickel. For example, with the aim of improving high-temperature characteristics, it has been proposed to coat a surface of lithium nickelate ($LiNiO_2$) with lithium titanate (see Patent Literature 1).

CITATION LIST

Patent Literature

[PTL 1] Japanese Laid-Open Patent Publication No. 2004-319105

SUMMARY OF INVENTION

Technical Problem

However, particles of the lithium-containing composite oxide including nickel have a weak binding force. Therefore, active material particles crack during the rolling, and an oxidation reaction of a non-aqueous electrolyte is likely to be caused on active faces formed by the cracks. In particular, when a battery is stored at a high temperature, or when a battery is charged and discharged repeatedly, the above oxidation reaction occurs remarkably and the amount of gas produced along with the oxidation reaction increases, which may possibly cause expansion of the battery.

Therefore, the present invention provides a method for producing a positive electrode capable of suppressing cracks of active material particles during the rolling of the positive electrode precursor, and a positive electrode produced by this method. Also, the present invention provides a non-aqueous electrolyte secondary battery having excellent high-temperature storage characteristics and charge/discharge cycle characteristics by using the positive electrode obtained by the above production method.

Solution to Problem

A positive electrode for non-aqueous electrolyte secondary battery of the present invention comprises: a positive electrode core material; and a positive electrode material mixture layer formed on a surface of the positive electrode core material, wherein the positive electrode material mixture layer includes a positive electrode active material, a binder, and a conductive agent, the positive electrode active material includes a lithium-containing composite oxide including nickel, the positive electrode active material includes secondary particles having an average particle diameter of 5 μm or more, and 3.5 g or more of the positive electrode active material is included per 1 $cm^3$ of the positive electrode material mixture layer.

A non-aqueous electrolyte secondary battery of the present invention comprises: the above positive electrode, a negative electrode including a negative electrode active material; a separator interposed between the above positive electrode and negative electrode; and a non-aqueous electrolyte.

A method for producing a positive electrode for non-aqueous electrolyte secondary battery of the present invention comprises the steps of:

(1) producing a positive electrode precursor by applying a positive electrode slurry including a positive electrode active material comprising a lithium-containing composite oxide including nickel, a binder, and a conductive agent on a positive electrode core material, the positive electrode active material including secondary particles having an average particle diameter of 8 μm or more, and then drying the positive electrode slurry to form a positive electrode material mixture layer; and (2) rolling while heating the positive electrode precursor to produce a positive electrode in which 3.5 g or more of said positive electrode active material is included per 1 $cm^3$ of the positive electrode material mixture layer, and the positive electrode active material includes secondary particles having an average particle diameter of 5 μm or more.

Advantageous Effects of Invention

According to the present invention, it is possible to obtain a non-aqueous electrolyte secondary battery having excellent charge/discharge cycle characteristics and high-temperature storage characteristics.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF EMBODIMENT

A method for producing a positive electrode for non-aqueous electrolyte secondary battery of the present invention comprises the steps of:

(1) producing a positive electrode precursor by applying a positive electrode slurry including a positive electrode active material comprising a lithium-containing composite oxide including nickel, a binder, and a conductive agent on a positive electrode core material, the positive electrode active material including secondary particles having an average particle diameter of 8 μm or more, and then drying the positive electrode slurry to form a positive electrode material mixture layer; and (2) rolling while heating the positive electrode precursor to produce a positive electrode in which 3.5 g or more of the positive electrode active material is included per 1 cm$^3$ of the positive electrode material mixture layer, and the positive electrode active material includes secondary particles having an average particle diameter of 5 μm or more.

The above secondary particles are secondary particles having a particle diameter of 1 to 30 μm comprising aggregated primary particles having a particle diameter of less than 1 μm in the positive electrode active material particle group. The above average particle diameter is an average particle diameter (D50) based on the volume.

In a conventional method where the positive electrode precursor is rolled once without being heated, it is necessary to roll with a large linear pressure in order to ensure the binding characteristic of the positive electrode material mixture layer. In the case where the amount of the positive electrode active material included per 1 cm$^3$ of the positive electrode material mixture layer is increased to about 3.5 g, the above positive electrode active material having a weak binding force cracks minutely into an average particle diameter of the secondary particles of about 4 μm, and many active faces are formed. Consequently, the amount of generated gas increases, which may cause expansion of the battery.

In contrast, when the positive electrode precursor is rolled while being heated, the pressure applied to the positive electrode precursor during the rolling can be reduced to an extent of being able to suppress particle cracks, the binding characteristic between the active material particles is improved greatly by the fact that the binder deforms readily, and therefore the positive electrode material mixture layer can be integrated with the positive electrode core material. The positive electrode material mixture layer having a desired positive electrode thickness and a desired active material density, and having an excellent binding characteristic between the active material particles can be obtained easily and surely by one rolling step. Even when the amount of the positive electrode active material included per 1 cm$^3$ of the positive electrode material mixture layer is set to 3.5 g or more, particle cracks can be suppressed, and the average particle diameter of the secondary particles of the positive electrode active material in the positive electrode can be maintained to 5 μm or more. When the amount of the positive electrode active material included per 1 cm$^3$ of the positive electrode material mixture layer is 3.5 g or more, a positive electrode having a very high filling density of the positive electrode active material and having a high capacity can be obtained. In particular, an extremely high filling density of the active material can be achieved in which the amount of the positive electrode active material included per 1 cm$^3$ of the positive electrode material mixture layer is 3.6 g or more, which could not have been achieved by the conventional method.

When the average particle diameter of the secondary particles of the positive electrode active material is 5 μm or more, particle cracks and active faces formed thereby are reduced greatly. Therefore, generation of gas accompanying the oxidation reaction on the active faces is suppressed greatly.

In the step (1), by using the positive electrode active material including secondary particles having an average particle diameter of 8 μm or more, the average particle diameter of the secondary particles of the positive electrode active material after the step (2) can be 5 μm or more.

The lithium-containing composite oxide (positive electrode active material) used in the step (1) can be obtained by baking, as raw materials, a mixture of a lithium salt such as LiOH and an oxide or hydroxide including nickel in an oxygen atmosphere (partial pressure of oxygen: 0.19 to 1 atm) at 600 to 1,000° C., for example. The lithium-containing composite oxide synthesized by this method includes secondary particles comprising aggregated and sintered primary particles having an average particle diameter of about 500 nm, but the binding force between the primary particles is weak. The size of the secondary particles of the synthesized lithium-containing composite oxide changes according to the particle size of the oxide or hydroxide including nickel.

In order to obtain the positive electrode active material including large-size secondary particles having an average particle diameter of the secondary particles of 8 μm or more used in the step (1), it is preferable to use a nickel-containing oxide or hydroxide of a large particle size having an average particle diameter of 8 μm or more in the synthesis of the lithium-containing composite oxide.

When baking the mixture of raw materials, in order to advance rapidly the synthesis reaction of the lithium-containing composite oxide to the inside of the particles of the oxide or hydroxide including nickel, it is preferable that the average particle diameter of the oxide or hydroxide including nickel is 8 to 12 μm. In this case, the average particle diameter of the secondary particles of the synthesized nickel-based lithium-containing composite oxide is 8 to 12 μm.

In view of the filling characteristic, the average particle diameter of the secondary particles of the positive electrode active material used in the step (1) is preferably 25 μm or less.

In order to improve further the filling characteristic of the positive electrode active material, it is preferable to use, as the positive electrode active material used in the step (1), a mixture of a coarse powder A including secondary particles having an average particle diameter of 18 to 25 μm and a fine powder B including secondary particles having an average particle diameter of 5 to 10 μm. It is preferable that the mixing weight ratio of the coarse powder A and the fine powder B is 90:10 to 60:40.

When using a method of rolling while heating the positive electrode precursor, it is possible to increase the amount of the positive electrode active material included per 1 cm$^3$ of the positive electrode material mixture layer to about 3.9 g by using the positive electrode active material in powder form having a high filling characteristic as above.

By the step (2), particle cracks of the active material during the rolling of the positive electrode precursor can be suppressed even when particles of the lithium-containing composite oxide including nickel having a weak binding force are used as the positive electrode active material.

Since there are few active faces formed by particle cracks of the active material, generation of gas accompanying the oxidation reaction on the active faces is suppressed during high-temperature storage and during charge/discharge cycle.

Since the binder is likely to deform by heating of the positive electrode precursor during the rolling, the binder can penetrate readily between the active material particles (slip characteristic is improved) even with a low pressure, the binding characteristic between the active material particles is improved.

The step (2) is a step of pressing the positive electrode precursor by using a heat plate, or a step of passing the positive electrode precursor between a pair of heat rolls. By carrying out this step once, it is possible to adhere closely and integrate the positive electrode material mixture layer with the positive electrode core material.

The total thickness of the positive electrode obtained in the step (2) (thickness of the positive electrode core material and the positive electrode material mixture layer formed on both surfaces of the positive electrode core material) is 80 to 200 µm, for example. The thickness of the positive electrode material mixture layer (one surface) formed on the positive electrode core material is 32.5 to 92.5 µm, for example.

In the case of forming the positive electrode material mixture layer on both surfaces of the positive electrode core material, the rolling ratio (ratio of the thickness of the positive electrode material mixture layer in the positive electrode after the rolling relative to the thickness of the positive electrode material mixture layer in the positive electrode precursor before the rolling) in the step (2) is 60 to 80%.

In order to decrease active faces formed by particle cracks of the active material, the decrease ratio of the average particle diameter of the secondary particles of the positive electrode active material is preferably 30 to 60%, more preferably 30 to 50%.

Herein, the decrease ratio can be determined by the following formula by defining the average particle diameter of the secondary particles in the positive electrode active material before the heating and rolling (after the step (1) and before the step (2)) as D1, and defining the average particle diameter of the secondary particles in the positive electrode active material after the heating and rolling (after the step (2)) as D2:

Decrease ratio of average particle diameter of secondary particles in positive electrode active material (%)=(D1−D2)/D1×100

During the rolling in the step (2), it is preferable to apply a linear pressure of $0.8 \times 10^3$ to $1.4 \times 10^3$ kgf/cm to the positive electrode precursor. When the linear pressure is $0.8 \times 10^3$ kgf/cm or more, a superior binding characteristic can be obtained between the positive electrode active material particles, and between the positive electrode material mixture layer and the positive electrode core material even by one rolling. When the linear pressure is $1.4 \times 10^3$ kgf/cm or less, particle cracks of the active material can be suppressed greatly. More preferably, the linear pressure applied to the positive electrode precursor during the rolling in the step (2) is $1.0 \times 10^3$ to $1.4 \times 10^3$ kgf/cm.

In the step (2), it is preferable to roll while heating the positive electrode precursor at such a temperature that the elastic modulus of the binder is 70% or less of the elastic modulus of the binder at 25° C.

The elastic modulus is an index representing difficulty of deforming. When the elastic modulus lowers, deformation is readily caused. By rolling while heating the positive electrode precursor at the above temperature, the binder deforms readily and penetrates readily between the active material particles, which improves greatly the binding characteristic between the active material particles.

Since the temperature at which the elastic modulus of the binder is 70% or less of the elastic modulus of the binder at 25° C. is 60 to 140° C., it is preferable to roll while heating the positive electrode precursor to 60 to 140° C. in the step (2). It is preferable to heat polyvinylidene fluoride (PVDF, hereinafter) within the above temperature range. By heating PVDF to 60 to 140° C., it is possible to lower the elastic modulus of PVDF to 70% or less of the elastic modulus thereof at 25° C.

In order to advance the positive electrode reaction to the inside of the active material particles (in order to obtain high positive electrode utilization ratio and favorable high-rate characteristics), it is preferable that the average particle diameter of the secondary particles of the positive electrode active material after the rolling in the step (2) is 12 µm or less. It is more preferable that the average particle diameter of the secondary particles of the positive electrode active material after the rolling in the step (2) is 7 µm or more because expansion of the battery is suppressed greatly.

The amount of the positive electrode active material included per 1 cm³ of the positive electrode material mixture layer is preferably 3.6 g or more, and more preferably 3.7 g or more.

Also, the amount of the positive electrode active material included per 1 cm³ of the positive electrode material mixture layer is preferably 3.9 g or less, and more preferably 3.8 g or less.

In this case, the positive electrode never breaks when winding the electrode group comprising the positive electrode, the negative electrode, and the separator.

It is preferable that the nickel-based lithium-containing composite oxide has an hexagonal crystal structure, and the content of nickel accounts for 60 to 90% by mol of all the metallic elements other than lithium. More preferably, the above content of nickel is 70 to 85% by mol. When the above content of nickel is less than 60% by mol, the effect by nickel (high capacity etc.) decreases. When the above content of nickel is more than 90% by mol, the effect by the metallic element other than lithium (element M below) cannot be exhibited sufficiently.

It is preferable that the nickel-based lithium-containing composite oxide is a compound represented by the general formula: $Li_aNi_{1-x}M_xO_{2+b}$, wherein M is at least one selected from the group consisting of Co, Fe, Cu, Mn, Al, Mg, Ti, Zr, Ce, and Y; $0.1 \leq x \leq 0.4$, $0.97 \leq a \leq 1.05$, and $-0.1 \leq b \leq 0.1$. Herein, "a" represents an initial value in the composition of the battery.

By replacing a part of Ni with a different element M, charge/discharge cycle characteristics and high-temperature storage characteristics are improved. When x is less than 0.1, the effect of replacing a part of Ni with the different element M decreases. When x is more than 0.4, the proportion of Ni in the lithium-containing composite oxide decreases, which renders the effect by Ni (high capacity etc.) insufficient.

The content of the binder in the positive electrode material mixture layer is preferably 1 to 3 parts by weight per 100 parts by weight of the positive electrode active material. The content of the conductive agent in the positive electrode material mixture layer is preferably 1 to 3 parts by weight per 100 parts by weight of the positive electrode active material.

As the binder, a thermoplastic resin is used, for example. Specific examples thereof include polyethylene, polypropylene, polytetrafluoroethylene (PTFE), polyvinylidene fluoride (PVDF), styrene-butadiene rubber, tetrafluoroethylene-hexafluoropropylene copolymer (FEP), tetrafluoroethylene-perfluoroalkyl vinylether copolymer (PFA), vinylidene fluoride-hexafluoropropylene copolymer, vinylidene fluoride-chlorotrifluoroethylene copolymer, ethylene-tetrafluoroethylene copolymer (ETFE resin), polychlorotrifluoroethylene (PCTFE), vinylidene fluoride-pentafluoropropylene copolymer, propylene-tetrafluoroethylene copolymer, ethylene-chlorotrifluoroethylene copolymer (ECTFE), vinylidene fluoride-hexafluoropropylene-tetrafluoroethylene copolymer, vinylidene fluoride-perfluoromethyl vinylether-tetrafluoroethylene copolymer, ethylene-acrylic acid copolymer and (Na$^+$) ion cross-linked copolymer thereof, ethylene-methacrylic acid copolymer or (Na$^+$) ion cross-linked copolymer thereof, ethylene-methyl acrylate copolymer or (Na$^+$) ion cross-linked copolymer thereof, ethylene-methyl methacrylate copolymer or (Na$^+$) ion cross-linked copolymer thereof, and derivatives of these materials. These materials can be used singly or in combination of two or more. Among these materials, PVDF and a derivative thereof are preferable.

In view of the binding characteristic and elasticity, it is preferable that PVDF and a derivative thereof have an average molecular weight of 300,000 to 1,000,000, and a crystallinity of 30 to 50%.

In view of the binding characteristic and elasticity, it is preferable that the ratio of vinylidene fluoride content in the derivative of PVDF (copolymer of vinylidene fluoride with other monomer) is 50 to 95% by weight.

Examples of the conductive agent include natural graphite, artificial graphite, carbon black, carbon fiber, and metal fiber. Examples of carbon black include acetylene black, Ketjen black, furnace black, lump black, and thermal black.

Examples of the positive electrode core material include a metal foil such as an aluminum foil and an aluminum alloy foil. The metal foil has a thickness of 10 to 20 μm, for example.

The non-aqueous electrolyte secondary battery of the present invention comprises the above positive electrode, a negative electrode including a negative electrode active material capable of electrochemically absorbing and desorbing Li, a separator interposed between the positive electrode and the negative electrode, and a non-aqueous electrolyte. Therefore, generation of gas during charge/discharge cycle or during high-temperature storage can be suppressed, expansion of the battery is suppressed, and the reliability is improved. The present invention is applicable to non-aqueous electrolyte secondary batteries of various shapes such as cylindrical, flat, coin-type, prismatic, and laminate-type, and the shape of the battery is not particularly limited.

As the negative electrode active material, carbon materials such as natural graphite, artificial graphite, acetylene black, and Ketjen black are used. The negative electrode can be formed by applying a negative electrode slurry including a carbon material and a binder onto a negative electrode current collector made of a copper foil etc., and drying and then rolling the same.

Also, as the negative electrode active material, lithium metal or a lithium alloy is used. The lithium alloy comprises Li and at least one element selected from the group consisting of Si, Sn, Al, Zn, and Mg, for example. The negative electrode is formed by applying a negative electrode slurry including lithium metal or a lithium alloy as the negative electrode active material, a conductive agent, and a binder onto a negative electrode current collector made of a copper foil etc., and drying and then rolling the same.

As the non-aqueous electrolyte, a liquid electrolyte comprising a non-aqueous solvent and a lithium salt dissolved therein is preferable. As the non-aqueous solvent, generally used is a mixed solvent of a cyclic carbonate such as ethylene carbonate and propylene carbonate with a chain carbonate such as dimethyl carbonate, diethyl carbonate, and ethylmethyl carbonate. Also, γ-butyrolactone and dimethoxyethane etc. are used. Examples of the lithium salt include inorganic lithium fluorides and lithium imide compounds. The inorganic lithium fluorides include LiPF$_6$ and LiBF$_4$, and the lithium imide compounds include LiN(CF$_3$SO$_2$)$_3$.

As the separator, a microporous film made of polyethylene, polypropylene etc. is used generally. The separator has a thickness of 10 to 30 μm, for example.

EXAMPLES

In the following examples of the present invention will be described in detail, but the present invention is not limited to these examples.

Example 1

(1) Preparation of Positive Electrode Active Material 3.2 kg of a mixture of nickel sulfate, cobalt sulfate, and aluminum sulfate mixed in the molar ratio of Ni atom, Co atom, and Al atom of 80:15:5 was dissolved in 10 L of water to obtain a raw material solution. 400 g of sodium hydroxide was added to the raw material solution to form deposit. The deposit was washed sufficiently with water and dried to obtain a coprecipitated hydroxide.

784 g of lithium hydroxide was mixed into 3 kg of the resulting Ni—Co—Al coprecipitated hydroxide, and the mixture was baked in an oxidizing atmosphere of oxygen partial pressure of 0.5 atm at a synthesizing temperature of 750° C. for 10 hours to obtain a lithium-containing composite oxide (LiNi$_{0.8}$Co$_{0.15}$Al$_{0.05}$O$_2$). The resulting lithium-containing composite oxide was examined with an electron microscope, and secondary particles formed of aggregated and sintered primary particles were observed. The average particle diameter of the secondary particles was measured to be 12 μm. For the measurement, a laser diffraction particle size distribution measurement apparatus (LA-920, manufactured by HORIBA, Ltd) was used. The average particle diameter of the secondary particles of the lithium-containing composite oxide can be adjusted by changing the average particle diameter of Ni—Co—Al coprecipitated hydroxide and lithium hydroxide.

(2) Production of Positive Electrode 3 kg of the positive electrode active material, 0.6 kg of PVDF#7208 (solution of N-methyl-2-pyrrolidone (NMP, hereinafter) containing 8% by weight of PVDF) manufactured by Kureha Corporation, 90 g of acetylene black, and an appropriate amount of NMP were stirred with a double-blade kneader to prepare a positive electrode slurry.

This PVDF had an average molecular weight of 630,000 and a crystallinity of 45%.

Table 1 shows ratios of elastic modulus of PVDF at each temperature relative to elastic modulus of PVDF at 25° C. In Table 1, the elastic modulus is a storage elastic modulus.

TABLE 1

| Temperature (° C.) | Elastic modulus of PVDF (MPa) | Ratio of elastic modulus at each temperature relative to elastic modulus at 25° C. (%) |
|---|---|---|
| 25 | 930 | 100 |
| 40 | 780 | 84 |
| 60 | 640 | 69 |
| 100 | 410 | 44 |
| 140 | 170 | 18 |
| 160 | 100 | 11 |

This positive electrode slurry was applied onto both surfaces of a positive electrode core material made of an aluminum foil having a thickness of 15 μm and dried to obtain a positive electrode precursor. Subsequently, the positive electrode precursor was passed through a pair of heat rollers and rolled. The number of times of rolling was one. More specifically, the positive electrode precursor was rolled with a linear pressure of $0.8 \times 10^3$ kgf/cm while being heated to 60° C. with heat rollers, thereby to form positive electrode material mixture layers on the surfaces of the positive electrode core material. At this time, the thickness of the positive electrode decreased from 185 μm to 130 μm. In this manner, a positive electrode having a total thickness of 130 μm was produced. The positive electrode was cut into a strip shape having a width of 43 mm.

(3) Production of Negative Electrode 3 kg of artificial graphite, 75 g of BM-400B (aqueous dispersion containing 40% by weight of modified styrene-butadiene rubber) manufactured by Zeon Corporation, 30 g of carboxymethyl cellulose (CMC), and an appropriate amount of water were stirred with a double-blade kneader to prepare a negative electrode slurry. This negative electrode slurry was applied onto both surfaces of a negative electrode current collector made of a copper foil having a thickness of 10 μm, dried and then rolled to form negative electrode material mixture layers, thereby producing a negative electrode having a total thickness of 140 μm. The negative electrode was cut into a strip shape having a width of 45 mm.

(4) Preparation of Non-Aqueous Electrolyte $LiPF_6$ was dissolved, at a concentration of 1 mol/L, in a mixed solvent of ethylene carbonate (EC), dimethyl carbonate (DMC), and ethylmethyl carbonate (EMC) mixed in the volume ratio of 1:1:1 to prepare a non-aqueous electrolyte. The non-aqueous electrolyte was made to include 3% by weight of vinylene carbonate.

(5) Assembly of Battery

Figure 1:
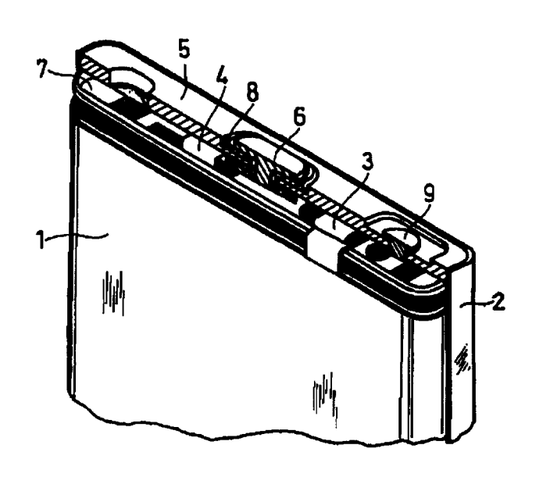
FIG. 1 A partially cut-away perspective view of an essential portion of a prismatic lithium ion secondary battery in accordance with an example of the present invention.

A prismatic lithium ion secondary battery as shown in FIG. 1 was produced.

The negative electrode, the positive electrode, and a separator comprising a microporous film made of polyethylene having a thickness of 20 μm (A089 (product name), manufactured by Celgard, LLC) interposed therebetween were wound up to form an electrode group 1 having a roughly oval cross section. The electrode group 1 was housed in a prismatic battery can 2 made of aluminum. The battery can 2 has a bottom portion and side walls, an open top portion, and a roughly rectangular shape. Subsequently, an insulator 7 for preventing short circuiting of the battery can 2 with a positive electrode lead 3 or a negative electrode lead 4 was arranged on top of the electrode group 1. Next, a rectangular sealing plate 5 having a negative electrode terminal 6 surrounded by an insulating gasket 8 in the center was arranged in an opening of the battery can 2. The negative electrode lead 4 was connected to the negative electrode terminal 6. The positive electrode lead 3 was connected to a lower face of the sealing plate 5. An end portion of the opening of the battery can 2 was welded with the sealing plate 5 by laser to seal the opening of the battery can 2. Then, 2.5 g of the non-aqueous electrolyte was injected into the battery can 2 from an injection hole of the sealing plate 5. Finally, the injection hole was closed with a sealing tap 9 by welding to complete a prismatic lithium ion secondary battery having a height of 50 mm, a width of 34 mm, a thickness of about 5.4 mm, and a design capacity of 850 mAh.

Comparative Example 1

A positive electrode was produced in the same manner as in Example 1 except for rolling the positive electrode precursor with a liner pressure of $1.6 \times 10^3$ kgf/cm without heating so that the positive electrode has the same total thickness (active material density) as the positive electrode of Example 1 in the step (2). By using this positive electrode, a non-aqueous electrolyte secondary battery was produced in the same manner as in Example 1.

Comparative Example 2

A positive electrode was produced in the same manner as in Example 1 except for rolling the positive electrode precursor without heating in the step (2). At this time, the positive electrode had a total thickness of 137 μm. By using this positive electrode, a non-aqueous electrolyte secondary battery was produced in the same manner as in Example 1.

The following evaluations were made with the positive electrodes and batteries of Example 1, and Comparative Examples 1 and 2.

[Evaluations of Positive Electrode]

The weight of the positive electrode active material included per 1 $cm^3$ of the positive electrode material mixture layer (active material density, hereinafter), and the average particle diameter of the secondary particles of the positive electrode active material were measured by the following formula.

(1) Measurement of Active Material Density

From the size (longitudinal, lateral, and thickness) of the positive electrode material mixture layer and the amount of the positive electrode active material, an active material density was determined by using the following formula:

Active material density ($g/cm^3$)=amount of positive electrode active material (g)/volume of positive electrode material mixture layer ($cm^3$)

(2) Measurement of Average Particle Diameter of Secondary Particles of Positive electrode Active Material The cross section of the positive electrode material mixture layer was examined with a scanning electron microscope (SEM). At this time, in an area of 100×100 μm in an SEM image, the largest diameters of fifty positive electrode active material particles (secondary particles) selected randomly were measured and an average value thereof was determined. Particles having a particle diameter of 1 to 30 μm formed of aggregated primary particles were measured as the secondary particles, and particles having a particle diameter of less than 1 μm were regarded as the primary particles and eliminated from the measurement target.

(3) Measurement of Decrease Ratio of Average Particle Diameter of Secondary Particles of Positive Electrode Active Material in Rolling Step From the average particle diameter of the secondary particles of the positive electrode active material before and after the rolling, a decrease ratio of the average particle diameter of the secondary particles by using the formula below. Herein, the decrease ratio is determined by the formula below by defining the average particle diameter of the secondary particles in the positive electrode active material before the rolling with heating (after the step (1) and before the step (2)) as D1, and the average particle diameter of the secondary particles in the positive electrode active material after the rolling with heating (after the step (2)) as D2.

Decrease ratio of average particle diameter of secondary particles of positive electrode active material (%)=(D1−D2)/D1×100

(4) Decrease Ratio of Thickness of Positive Electrode Material Mixture Layer in Rolling step (Rolling Ratio)

The thickness of the positive electrode material mixture layer before and after the rolling of the positive electrode active material was measured, and a rolling ratio was determined by the following formula:

storage capacity maintenance ratio was determined by the following formula:

Storage capacity maintenance ratio (%)=discharge capacity after storage/discharge capacity before storage×100

Also, the battery thickness before and after the storage was measured. By the following formula, an increase ratio of the battery thickness (%) after the storage relative to the initial battery thickness was determined.

Increase ratio of battery thickness (%)=battery thickness after storage/battery thickness before storage×100

Results of the above evaluations are shown in Table 2.

TABLE 2

|  | Step (2) | | Positive electrode active material in positive electrode | | Decrease ratio of average particle diameter of secondary particles (%) | Rolling ratio of positive electrode material mixture layer (%) | Charge/discharge cycle | | High-temperature storage | |
| --- | --- | --- | --- | --- | --- | --- | --- | --- | --- | --- |
|  | Linear pressure (×$10^3$ kgf/cm) | Heating temperature (° C.) | Density (g/cm$^3$) | Average particle diameter of secondary particles (μm) |  |  | Capacity maintenance ratio (%) | Increase ratio of battery thickness (%) | Capacity maintenance ratio (%) | Increase ratio of battery thickness (%) |
| Ex. 1 | 0.8 | 60 | 3.50 | 7.4 | 38 | 70 | 83 | 108 | 86 | 107 |
| C. Ex. 1 | 1.6 | No heating | 3.50 | 3.9 | 68 | 70 | 63 | 122 | 73 | 118 |
| C. Ex. 2 | 0.8 | No heating | 3.50 | 4.7 | 61 | 74 | 58 | 126 | 69 | 114 |

Rolling ratio (%)=thickness of positive electrode material mixture layer after rolling/thickness of positive electrode material mixture layer before rolling×100

[Evaluations of Prismatic Battery]

(1) Evaluation of Charge/Discharge Cycle Characteristics

An initial capacity was determined by charging and discharging under the following conditions in an environment at 20° C. Subsequently, charging and discharging were repeated for 500 cycles under the following conditions in an environment at 20° C., and a discharge capacity at the 500th cycle was determined. Cycle capacity maintenance ratio was determined by the following formula:

Cycle capacity maintenance ratio (%)=discharge capacity at 500th cycle/initial discharge capacity×100

<Charge/Discharge Conditions>

Constant current charge: charge current 850 mA, charge end voltage 4.2 V

Constant voltage charge: charge voltage 4.2 V, charge end current 100 mA

Constant current discharge: discharge current 850 mA, discharge end voltage 3V.

Further, an initial battery thickness and a battery thickness after 500 cycles were measured. An increase ratio of battery thickness (%) was determined by the following formula:

Increase ratio of battery thickness (%)=battery thickness after 500 cycles/initial battery thickness×100

(2) Evaluation of High-Temperature Storage Characteristics

Charging and discharging were carried out in an environment at 20° C. under the above conditions, and an initial discharge capacity was determined. Subsequently, the battery was stored for two days at 80° C. After the storage, charging and discharging were carried out under the same conditions, and a discharge capacity after the storage was determined. A In the battery using the positive electrode of Example 1, in comparison with the batteries using the positive electrodes of Comparative Examples 1 and 2, the increase ratio of battery thickness decreased greatly, expansion of the battery was suppressed, and excellent charge/discharge cycle characteristics and high-temperature storage characteristics were achieved.

In Comparative Example 1, since the positive electrode precursor was not heated during the rolling, when the rolling was done so that the positive electrode precursor had the same rolling ratio as Example 1, the linear pressure during the rolling of Comparative Example 1 was higher than the linear pressure during the rolling of Example 1. As a result, cracks of the active material particles were readily caused, and the average particle diameter of the secondary particles of the active material decreased.

In Comparative Example 2, since the positive electrode precursor was not heated during the rolling, when the rolling was done with the same linear pressure as in Example 1, the binder did not penetrate sufficiently between the active material particles and the binding characteristic lowered in the positive electrode of Comparative Example 2 in comparison with the positive electrode of Example 1.

Example 2

Positive electrodes were produced in the same manner as in Example 1 except for changing the linear pressure and the heating temperature to the values shown in Table 3 in the step (2). By using these positive electrodes, batteries were produced in the same manner as in Example 1. By the above method, the positive electrodes and the batteries were evaluated. The evaluation results are shown in Table 3.

TABLE 3

| Battery No. | Step (2) Linear pressure (×10³ kgf/cm) | Step (2) Heating temperature (° C.) | Positive electrode active material in positive electrode Density (g/cm³) | Positive electrode active material in positive electrode Average particle diameter of secondary particles (μm) | Decrease ratio of average particle diameter of secondary particles (%) | Rolling ratio of positive electrode material mixture layer (%) | Charge/discharge cycle Capacity maintenance ratio (%) | Charge/discharge cycle Increase ratio of battery thickness (%) | High-temperature storage Capacity maintenance ratio (%) | High-temperature storage Increase ratio of battery thickness (%) |
|---|---|---|---|---|---|---|---|---|---|---|
| A | 1.0 | 40 | 3.50 | 6.8 | 43 | 70 | 75 | 110 | 85 | 108 |
| B | 1.0 | 60 | 3.55 | 7.2 | 40 | 69 | 87 | 107 | 88 | 107 |
| C | 1.0 | 100 | 3.59 | 7.3 | 39 | 69 | 89 | 106 | 88 | 107 |
| D | 1.0 | 140 | 3.63 | 6.5 | 46 | 67 | 81 | 108 | 87 | 108 |
| E | 1.0 | 160 | 3.70 | 5.9 | 51 | 67 | 77 | 109 | 85 | 109 |

In all the positive electrodes, the active material density was 3.5 g/cm³ or more and the average particle diameter of the secondary particles of the active material was 5 μm or more, and all the batteries exhibited favorable charge/discharge cycle characteristics and high-temperature storage characteristics. In particular, batteries B to D achieved superior charge/discharge cycle characteristics and high-temperature storage characteristics, which revealed that preferable heating temperature in the step (2) was 60 to 140° C.

Example 3

Positive electrodes were produced in the same manner as in Example 1 except for changing the linear pressure and the heating temperature in the step (2) were changed to the values shown in Table 4. By using these positive electrodes, batteries were produced in the same manner as in Example 1. The positive electrodes and the batteries were evaluated by the above method. The evaluation results are shown in Table 4.

Example 4

A coarse powder A of lithium-containing composite oxide ($LiNi_{0.8}Co_{0.15}Al_{0.05}O_2$) having an average secondary particle diameter of the secondary particles of 23 μm and a fine powder B of lithium-containing composite oxide ($LiNi_{0.8}Co_{0.15}Al_{0.05}O_2$) having an average particle diameter of the secondary particles of 7 μm were mixed in the weight ratio of 80:20 to obtain a powder of a positive electrode active material having an average particle diameter of the secondary particles of 20 μm.

The average particle diameter of the secondary particles of the coarse powder A and the fine powder B were adjusted by changing the average particle diameter of Ni—Co—Al coprecipitated oxide and lithium hydroxide used in the synthesis of the lithium-containing composite oxide in the pro-

TABLE 4

| Battery No. | Step (2) Linear pressure (×10³ kgf/cm) | Step (2) Heating temperature (° C.) | Positive electrode active material in positive electrode Density (g/cm³) | Positive electrode active material in positive electrode Average particle diameter of secondary particles (μm) | Decrease ratio of average particle diameter of secondary particles (%) | Rolling ratio of positive electrode material mixture layer (%) | Charge/discharge cycle Capacity maintenance ratio (%) | Charge/discharge cycle Increase ratio of battery thickness (%) | High-temperature storage Capacity maintenance ratio (%) | High-temperature storage Increase ratio of battery thickness (%) |
|---|---|---|---|---|---|---|---|---|---|---|
| F | 0.6 | 140 | 3.50 | 8.1 | 33 | 71 | 72 | 110 | 85 | 106 |
| G | 0.8 | 140 | 3.58 | 7.7 | 36 | 69 | 89 | 105 | 89 | 106 |
| H | 1.0 | 140 | 3.63 | 6.5 | 46 | 68 | 86 | 107 | 87 | 108 |
| I | 1.4 | 140 | 3.73 | 6.0 | 50 | 66 | 82 | 108 | 86 | 108 |
| J | 1.6 | 140 | 3.78 | 5.3 | 56 | 65 | 73 | 110 | 85 | 109 |

In all the positive electrodes, the active material density was 3.5 g/cm³ or more and the average particle diameter of the secondary particles of the active material was 5 μm or more, and all the batteries had favorable charge/discharge cycle characteristics and high-temperature storage characteristics. In particular, batteries G to I achieved superior charge/discharge cycle characteristics and high-temperature storage characteristics, which revealed that the preferable linear pressure in the step (2) was 0.8×10³ to 1.4×10³ kgf/cm.

duction of the same lithium-containing composite oxide as in Example 1.

A positive electrode was produced in the same manner as in Example 1 except for setting the linear pressure to 1.4×10³ kgf/cm and the heating temperature to 140° C. in the step (2). By using this positive electrode, a battery was produced in the same manner as in Example 1. The positive electrode and the battery were evaluated by the above method. The evaluation results are shown in Table 5.

TABLE 5

| | Step (2) | | Positive electrode active material in positive electrode | | Decrease ratio of average particle diameter of secondary particles (%) | Rolling ratio of positive electrode material mixture layer (%) | Charge/discharge cycle | | High-temperature storage | |
|---|---|---|---|---|---|---|---|---|---|---|
| Battery No. | Linear pressure (×10³ kgf/cm) | Heating temperature (° C.) | Density (g/cm³) | Average particle diameter of secondary particles (μm) | | | Capacity maintenance ratio (%) | Increase ratio of battery thickness (%) | Capacity maintenance ratio (%) | Increase ratio of battery thickness (%) |
| K | 1.4 | 140 | 3.85 | 8.3 | 49 | 64 | 71 | 111 | 85 | 110 |

In the battery K, favorable charge/discharge cycle characteristics and high-temperature storage characteristics were achieved. In the battery K, a positive electrode having an extremely high filling density of active material of 3.85 g/cm³ could be obtained by rolling while heating the positive electrode precursor including an active material powder having a high filling characteristic.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

INDUSTRIAL APPLICABILITY

The positive electrode of the present invention is used suitably in cylindrical or prismatic non-aqueous electrolyte secondary batteries. The non-aqueous electrolyte secondary battery of the present invention is used suitably as a power source for electronic devices such as information equipment because of having superior charge/discharge cycle characteristics and high-temperature storage characteristics.

The invention claimed is:

1. A positive electrode for non-aqueous electrolyte secondary battery comprising: a positive electrode core material; and a positive electrode material mixture layer formed on a surface of said positive electrode core material, wherein said positive electrode material mixture layer includes a positive electrode active material, a binder, and a conductive agent, said positive electrode active material includes a lithium-containing composite oxide including nickel, said lithium-containing composite oxide has a hexagonal crystal structure, and a content of said nickel accounts for 60 to 90% by mol of all metallic elements other than lithium, said lithium-containing composite oxide includes secondary particles having an average particle diameter of 5 μm or more, and 3.5 g or more of said positive electrode active material is included per 1 cm³ of said positive electrode material mixture layer.

2. The positive electrode for non-aqueous electrolyte secondary battery in accordance with claim 1, wherein said lithium-containing composite oxide is represented by the general formula:

$Li_aNi_{1-x}M_xO_{2+b}$, where M is at least one selected from the group consisting of Co, Fe, Cu, Mn, Al, Mg, Ti, Zr, Ce, and Y; $0.1 \leq x \leq 0.4$; $0.97 \leq a \leq 1.05$; and $-0.1 \leq b \leq 0.1$.

3. A non-aqueous electrolyte secondary battery comprising: the positive electrode in accordance with claim 1; a negative electrode including a negative electrode active material; a separator interposed between said positive electrode and said negative electrode; and a non-aqueous electrolyte.

* * * * *